UNITED STATES PATENT OFFICE.

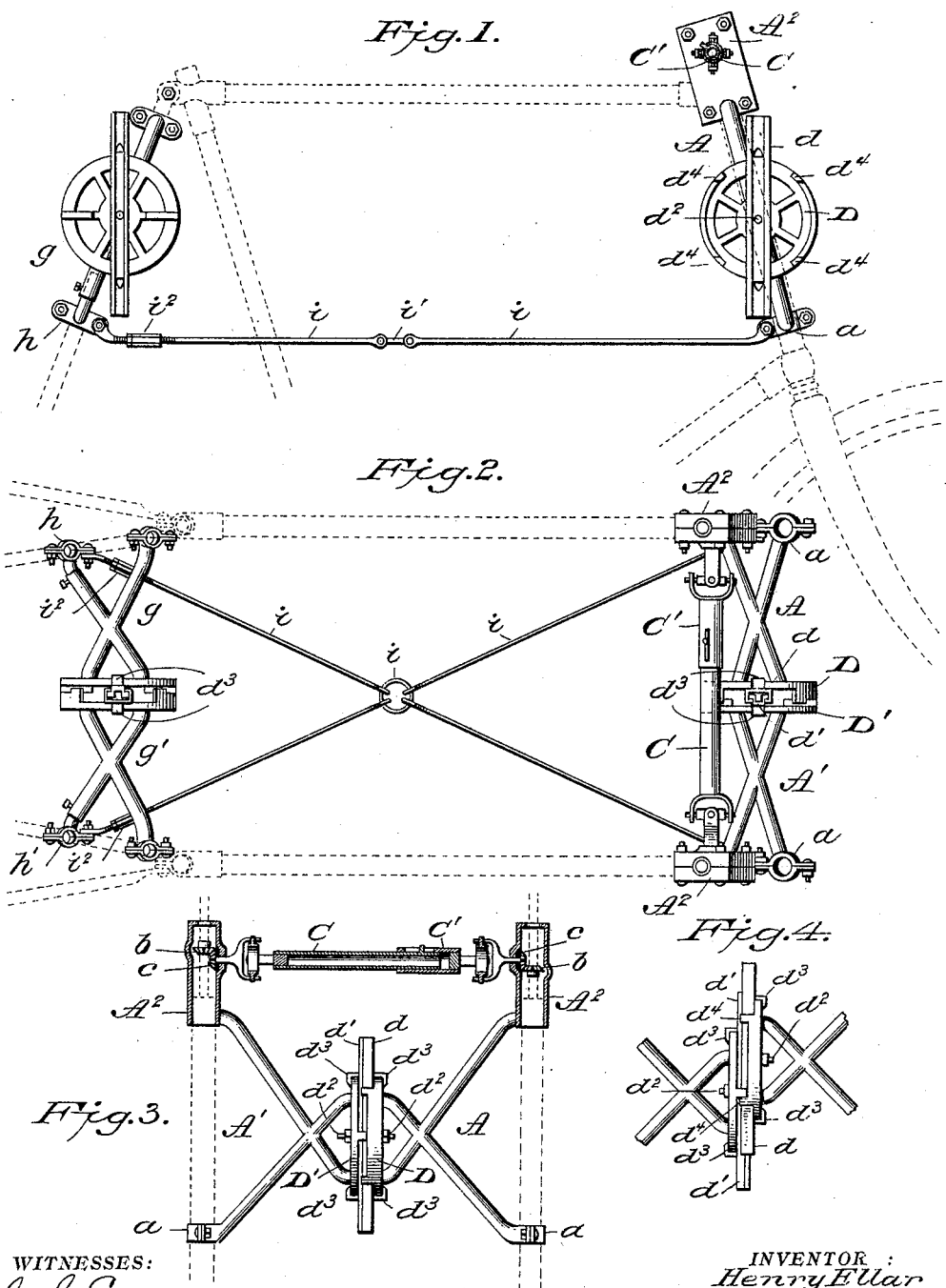

HENRY ELLAR, OF CLARKSDALE, MISSOURI.

BICYCLE-COUPLING.

SPECIFICATION forming part of Letters Patent No. 603,501, dated May 3, 1898.

Application filed July 22, 1897. Serial No. 645,505. (No model.)

*To all whom it may concern:*

Be it known that I, HENRY ELLAR, a citizen of the United States of America, residing at Clarksdale, in the county of De Kalb and State of Missouri, have invented certain new and useful Improvements in Bicycle-Couplings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in bicycle-couplings; and it consists in certain novel features of construction and combination of the parts whereby I provide means for connecting two bicycles side by side in such a manner as to allow both the coupled bicycles and their riders to maintain a vertical position not only when passing over level ground, but also upon sloping or uneven ground, so as to avoid lateral strain on the bicycles and the cramping or binding of the wheel-bearings which is occasioned by the weight of the riders bearing vertically while the bicycles assume an inclined position on sloping or uneven ground.

My invention has also in view to provide an improved bicycle-coupler the steering parts of which will perfectly synchronize the movement of the steering-wheels and so arrange the steering parts that the front or steering wheels may be turned to any point desired, even as far as right angles to the frame.

My invention has further for its object to generally improve the construction of coupling devices and supply one which will be light and strong and which may be quickly applied and detached from bicycles of ordinary construction and will provide a range of adjustment which will permit bicycles of different types of frame to be coupled together.

In the accompanying drawings, which illustrate my invention, Figure 1 is a side elevation, partly in section, one-half of the coupling device being removed. Fig. 2 is a plan view of the coupling device, the frames to which the coupler is applied being shown in dotted lines. Fig. 3 is a front elevation, partly in section. Fig. 4 is a front or rear elevation of a part of the coupling, showing the position of the parts when the bicycles are on uneven ground.

To the steering-heads of the bicycles are clamped frames A A', each having clamps $a\,a$, which embrace the steering-head. These frames are made up of light bars which cross each other, the upper ends of the bars being attached to hollow sections $A^2$, which are open at their lower ends and are of such a size that they may fit over the steering-heads and be securely attached thereto and to the frames of the machines, said hollow sections or boxes being clamped thereto by bolts, as shown. The steering-posts of the bicycles pass through apertures in the upper portions of the hollow sections on boxes $A^2$, and said steering-posts carry miter-wheels $b$, which may be secured to the posts by set-screws, one of the miter-wheels having the teeth projecting upwardly while the other miter-wheel has its teeth projecting downwardly, so that these wheels will be in a reversed position with respect to each other. The boxes or sections $A^2$ carry bearings, and through said bearings pass fixtures having on one end mitered wheels $c\,c$, the other ends of said fixtures being shaped to form the parts of universal couplings, the other parts of the universal couplings being connected to hollow rods C C', which are telescopically connected with each other, the rod C' having therein a longitudinal slot, while the other rod has a lug which passes through the aforesaid slot and prevents the rods C C' turning upon each other, said connection permitting a sliding movement of the hereinbefore-mentioned rods upon each other. The handle-bars of the bicycles are connected to the steering-posts and through said posts with the front forks and steering-wheels, and by means of the connection hereinbefore described the wheels are geared together, so as to move synchronously or in unison, and there is no danger of one wheel clamping the other.

The frames A A' are connected to each other by plates or disks D D', to which are secured slide-bars $d\,d'$. The plates or disks are practically rigid to the frames A A', and the slide-bars $d\,d'$ form the connecting means for the plates and are attached pivotally to said plates by bolts and nuts $d^2\,d^2$, and the slide-bars have projecting hooks $d^3$, which lie over the peripheries and faces of the plates and assist the bolts in holding the parts in connection with each other and permit the plates and frames to turn one with respect to the other. The slide-plates $d\ d'$ are formed one with a groove and the other with a flange, so that they will be held in longitudinal engagement with each other, and such movement is limited by lugs $d^4$, formed on the plates or disks, by reason of the lugs engaging with each other, said lugs also serving to limit the rotary movement of the disks.

The rear frames of the bicycles are connected to each other by frames, plates, and slide-bars which are similar in construction to those previously described and are referred to by the letters $g\ g'$, and the lower bars of the frame have clamps $h\ h'$ with short sections, which are adjustably connected to the cross-bar frames by clamping-bolts, so as to provide for a range of adjustment which will adapt the device to be used in connecting bicycles having the rear bars of the frame thereof at different inclinations or angles. The upper clamps of the frames $g\ g'$ are substantially rigid.

The front and rear cross-frames may be connected by coupling-rods $i\ i$, which engage with the front and rear lower clamps, the attachments being made by suitable bolts, and these coupling-bars $i\ i$ engage centrally with a ring $i'$. The rear coupling-bars may be made in two parts, the adjacent ends being threaded, a convenient means of connecting being a turnbuckle and lock-nut, as shown at $i^2$.

The device hereinbefore described is readily applied and will permit two bicycles of different types to be coupled together, and when the bicycles are coupled will permit the same to assume different vertical elevations, thereby overcoming the objectionable features incident to the rigid connection of the two frames to each other. In Fig. 4 of the drawings I have shown the connecting-plates positioned as if one of the bicycles were on high ground and the other on lower ground, and the steering-heads are so connected that they are not affected by the change of the vertical position of one bicycle with respect to the other.

Having thus described my invention, what I claim as new, and desire to secure by Letters Patent, is—

1. In a coupling for bicycles, the combination with a longitudinally-expansible coupling-bar, of steering-heads having miter-gears attached thereto, miter-gears for engagement therewith and universal couplings between the gears and the ends of the expansible coupling-bar, substantially as shown.

2. In a coupling for connecting two bicycles side by side, a pair of divided or two-part frames, each pair of frames being connected so that they may have a vertical and pivotal movement, clamps for connecting the same to the frames of the bicycles, in combination with steering-posts having miter-gears thereon and a telescopic connecting-bar having at its ends universal joints provided with miter-gears to engage those on the steering-post, housings or boxes in which sections of the universal joints are journaled, so as to hold the miter-gears thereof in mesh with the gears on the steering-heads, substantially as shown.

3. The combination with the coupling-frames for connecting two bicycles side by side, so that one may have a vertical movement independent of the other, a telescopic bar, universal joints and miter-gears connected thereto, of steering-posts having miter-gears with which the miter-gears connected to the telescopic bar mesh, substantially as shown.

4. In combination with the steering-posts of a pair of coupled bicycles, mitered gears secured thereon, of a telescopic connecting-bar, universal joints connected thereto and journaled in housings which engage the steering-heads of the bicycles and miter-gears connected with the universal joints so as to engage with the gears on the steering-posts, substantially as set forth.

5. A coupling for bicycles, comprising cross-frames, the outer ends thereof having clamps for engagement with the frames of the bicycles, said frames also carrying disks or plates with lugs or projections thereon, slide-bars which engage pivotally with the disks and means for holding the same in sliding engagement with each other, substantially as shown and for the purpose set forth.

In testimony whereof I affix my signature in presence of two witnesses.

HENRY ELLAR.

Witnesses:
I. E. TODD,
A. A. MORTON.